(12) United States Patent
Imamura et al.

(10) Patent No.: US 6,940,199 B2
(45) Date of Patent: Sep. 6, 2005

(54) PERMANENT MAGNET ROTOR AND BRUSHLESS MOTOR

(75) Inventors: Takehiro Imamura, Saitama (JP); Minoru Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/957,573

(22) Filed: Oct. 5, 2004

(65) Prior Publication Data

US 2005/0110356 A1    May 26, 2005

(30) Foreign Application Priority Data

Oct. 10, 2003  (JP) .......................... P.2003-352192

(51) Int. Cl.$^7$ ............................................. H02K 21/12
(52) U.S. Cl. ............ 310/156.48; 310/261; 310/156.01; 310/156.49
(58) Field of Search ........................... 310/261, 156.01, 310/152, 156.63, 156.47, 156.53, 156.68, 310/156.48, 156.49

(56) References Cited

U.S. PATENT DOCUMENTS

| 6,034,458 | A | * | 3/2000 | Uetake et al. ......... 310/156.49 |
| 6,717,315 | B1 | * | 4/2004 | Tajima et al. ......... 310/156.45 |
| 2004/0017123 | A1 | * | 1/2004 | Miyashita et al. ..... 310/156.53 |

FOREIGN PATENT DOCUMENTS

| JP | 5-76146 |   | 3/1993 |   |
| JP | 10-285849 |   | 10/1998 |   |
| JP | 11018324 | * | 1/1999 | ............ H02K 1/27 |
| JP | 2002262533 | * | 9/2002 | ............ H02K 1/27 |
| JP | 2002-305859 |   | 10/2002 |   |
| JP | 2005007988 | * | 5/2003 | ............ H02K 1/27 |
| JP | 2004163272 | * | 2/2004 | ............ H02K 1/27 |

* cited by examiner

*Primary Examiner*—Dang Le
*Assistant Examiner*—Heba Elkassabgi
(74) *Attorney, Agent, or Firm*—Westerman, Hattori, Daniels & Adrian, LLP

(57) ABSTRACT

In a rotor 20 including a plurality of permanent magnet pieces 60 fixed in a plurality of magnet insertion slots 43 provided on the outer periphery of a rotor yoke 40, respectively, and the rotor yoke 40 having concaves 44 each provided between the permanent magnet pieces 60 adjacent to each other and protrusions 46 each provided in each the concaves 44 to protrude outwardly in the radial direction of the rotor yoke 40, between the sandwiching angle α formed by two sides connecting both outer ends A and A' of each the concaves 44 to the center axis O of the rotor yoke 40 and the sandwiching angle β formed by two sides connecting both outer ends B and B' of each the protrusions 46 to the center axis O of the rotor yoke 40, the following relationship is satisfied:

$0.3 < \beta/\alpha < 0.5$.

3 Claims, 6 Drawing Sheets ved with the
PERMANENT MAGNET ROTOR AND BRUSHLESS MOTOR

BACKGROUND OF THE INVENTION

This invention relates to a permanent magnet rotor having permanent magnets provided at a rotor iron core and a brushless motor equipped with such a rotor.

As a rotor used for a motor, a permanent magnet rotor is known in which permanent magnets are provided at a plurality magnet attaching segments arranged at a rotor iron core. The permanent magnet rotor includes a type of having a convex (convex pole) between adjacent magnets (e.g. Patent Reference 1) and another type of having not the convex but a concave between the adjacent magnets (e.g. Patent Reference 2).

Both types of permanent-magnetic rotors and brushless motors equipped with these rotors have advantages and disadvantages, respectively.

The permanent magnet rotor of a type having the convex and brushless motor equipped with such a rotor have advantages that (1) reluctance torque is relatively large, and (2) the magnetic flux passes through the convex and hence easily passes through the yoke at a more inner side in a radial direction than the magnet so that the magnetic flux is difficult to be saturated, thus giving "senserless position detection" with a high accuracy, but also have disadvantages of more heat generation of the magnet and being fragile to demagnetization. The "senserless position detection" is to estimate the position of the rotor on the basis of the current flowing through each of windings in a multiple phase when a voltage for position detection is applied to the windings of a stator.

On the other hand, the permanent-magnetic rotor of a type having not the convex but the concave and the brushless motor equipped with such a rotor have advantages of less magnet heat generation and being tolerant to demagnetization, but disadvantages that (1) the reluctance torque is relatively small, and (2) because of absence of the convex, the magnetic flux from the stator is difficult to pass through the yoke at a more outer side in a radial direction than the magnet so that the magnetic flux is likely to be saturated, thus giving "senserless position detection" with a low accuracy, and (3) the thickness of the yoke on both sides in a circumferential direction of the magnet is decreased, thereby low strength against the centrifugal force during a high speed rotation.

Proposed are also a rotor in which an auxiliary pole portion is provided through a groove (concave) between permanent magnets adjacent to each other and a brushless motor equipped with such a rotor (e.g. Patent Reference 3). Patent Reference 3 describes that torque pulsation can be suppressed when the pitch of the slots in a stator, open angle of the magnetic pole of the permanent magnet in the rotor and the open angle of the auxiliary pole are set in their dimension so as to satisfy a prescribed relationship.

Patent Reference 1: JP-A-Hei5-76146
Patent Reference 2: JP-A-Hei10-285849
Patent Reference 3: JP-A-2002-305859

Now, it is eagerly demanded to develop a rotor capable of satisfying all the requirements of an increase in reluctance torque, improvement in the sensorless position detection accuracy and suppression of magnet heat generation and a brushless motor equipped with such a rotor. The brushless motor disclosed in Patent Reference 3 cannot solve such a problem.

SUMMARY OF THE INVENTION

In view of this circumstance, this invention intends to provide a permanent magnet rotor with relative large reluctance torque, improved accuracy of sensorless position detection and less magnet heat generation.

The invention described in aspect 1 is a permanent magnet rotor (e.g. rotor 20 in the embodiments described later) including a plurality of permanent magnet pieces (e.g., permanent magnet pieces 60 in the embodiments described later) fixed in a plurality of magnet attaching segments (e.g., magnet insertion slots 43 and magnet accommodating concave segments 71 in the embodiments described later) provided on the outer periphery or inner periphery of a rotor iron core, respectively, and the rotor iron core (e.g., rotor yoke 40 in the embodiments described later) with concaves (e.g. concaves 44 and 72 in the embodiments described later) each provided between the permanent magnet pieces adjacent to each other and protrusions (protrusions 46 and 73 in the embodiments described later) each provided in each the concaves to protrude outwardly in the radial direction of the rotor iron core, between the sandwiching angle α formed by two sides connecting both outer ends of each the concaves to the center axis of the rotor iron core and the sandwiching angle β formed by two sides connecting both outer ends of each the protrusions to the center axis of the rotor iron core, is satisfied:

$$0.3<\beta/\alpha<0.5.$$

In this configuration, since the rotor is provided with the protrusions, the reluctance torque can be made large; since the rotor is provided with the concaves, magnet heat generation can be suppressed, thereby making demagnetization difficult. Further, in a brushless motor combined with a stator, the magnetic flux emitted from the stator passes through the protrusion and also passes through a yoke area located at a more inner side than the permanent magnet piece in the radial direction. For this reason, the magnetic flux is difficult to be saturated, thereby extremely increasing the accuracy of the sensorless position detection. Particularly, since the sandwiching angles α and β are set in the angular relationship satisfying, the improvement of the sensorless position detection accuracy and the suppression of the magnet heat generation can be reconciled.

The invention described in aspect 2 is a brushless motor comprising: a permanent magnet rotor (e.g. rotor 20 in the embodiments described later) including a plurality of permanent magnet pieces (e.g., permanent magnet pieces 60 in the embodiments described later) fixed in a plurality of magnet attaching segments (e.g., magnet insertion slots 43 and magnet accommodating concaves 71 in the embodiments described later) provided on the outer periphery or inner periphery of a rotor iron core, respectively, and the rotor iron core (e.g., rotor yoke 40 in the embodiments described later) with concaves (e.g. concaves 44 and 72 in the embodiments described later) each provided between the permanent magnet pieces adjacent to each other and protrusions (protrusions 46 and 73 in the embodiments described later) each provided in each the concaves to protrude outwardly in the radial direction of the rotor iron core; and a stator (e.g. stator 10 in the embodiments described later) arranged oppositely to the permanent magnet rotor, wherein the position of the rotor can be estimated on the basis of the current flowing through each winding in a multiple phase when a voltage for detecting the position of the rotor is applied to the windings (e.g. windings 12 in the embodiments described later) of the stator, characterized in that between the sandwiching angle α formed by two sides connecting both outer ends of each the concaves to the center axis of the rotor iron core and the sandwiching angle β formed by two sides connecting both outer ends of each the protrusions to the center axis of the rotor iron core, is satisfied:

$0.3<\beta/\alpha<0.5$.

In this configuration, since the rotor is provided with the protrusions, the reluctance torque can be made large. Further, the magnetic flux emitted from the stator passes through the protrusion and further can reach a yoke area located at a more inner side than the permanent magnet piece in the radial direction. For this reason, the magnetic flux is difficult to be saturated, thereby extremely increasing the accuracy of the sensorless position detection. In addition, since the rotor is provided with the protrusions, an alternate magnetic flux change in the vicinity of the protrusions is reduced, thereby reducing the magnetic flux change in the magnet itself. If the magnetic flux change in the magnet is little, an eddy current is also little, thereby suppressing the magnet heat generation and making its demagnetization difficult.

Particularly, since the sandwiching angles α and β are set in the angular relationship satisfying, the improvement of the sensorless position detection accuracy and the suppression of the magnet heat generation can be reconciled.

The invention described in aspect 3 is a brushless motor according to aspect 2, characterized in that the distance between the outer end of each the protrusions and the outer end of each the concaves located oppositely thereto is larger than that in the radial direction of the gap formed between the rotor and the stator.

In this configuration, it is possible to realize that the magnetic flux of the permanent magnet piece easily passes from the outer periphery of the magnet attaching segment toward the stator, the magnetic flux is difficult pass to the area where the protrusion and concave are arranged, and the short-circuiting of the magnetic flux between the adjacent permanent magnet pieces is difficult to occur.

In accordance with the permanent magnet rotor described in aspect 1, the reluctance torque can be made large and magnet heat generation can be suppressed, thereby making demagnetization difficult. In a brushless motor combined with a stator, the senserless position detection accuracy can be increased extremely. Particularly, since the sandwiching angles α and β are set in the angular relationship satisfying, the improvement of the sensorless position detection accuracy and the suppression of the magnet heat generation can be reconciled.

In accordance with the brushless motor described in aspect 2, the reluctance torque can be made large, and the senserless position detection accuracy can be increased extremely. In addition, the magnet heat generation can be suppressed, thereby making demagnetization difficult. Particularly, since the sandwiching angles α and β are set in the angular relationship satisfying, the improvement of the sensorless position detection accuracy and the suppression of the magnet heat generation can be reconciled.

In accordance with the invention described in aspect 3, it is possible to realize that the magnetic flux of the permanent magnet piece easily passes from the outer periphery of the magnet attaching segment toward the stator, and the short-circuiting of the magnetic flux between the adjacent permanent magnet pieces is difficult to occur. Thus, since the magnetic flux between the rotor and the stator can be usefully employed, the torque can be produced effectively.

DETAILED DESCRIPTION OF THE PREFERRED EMBODIMENTS

Figure 1:
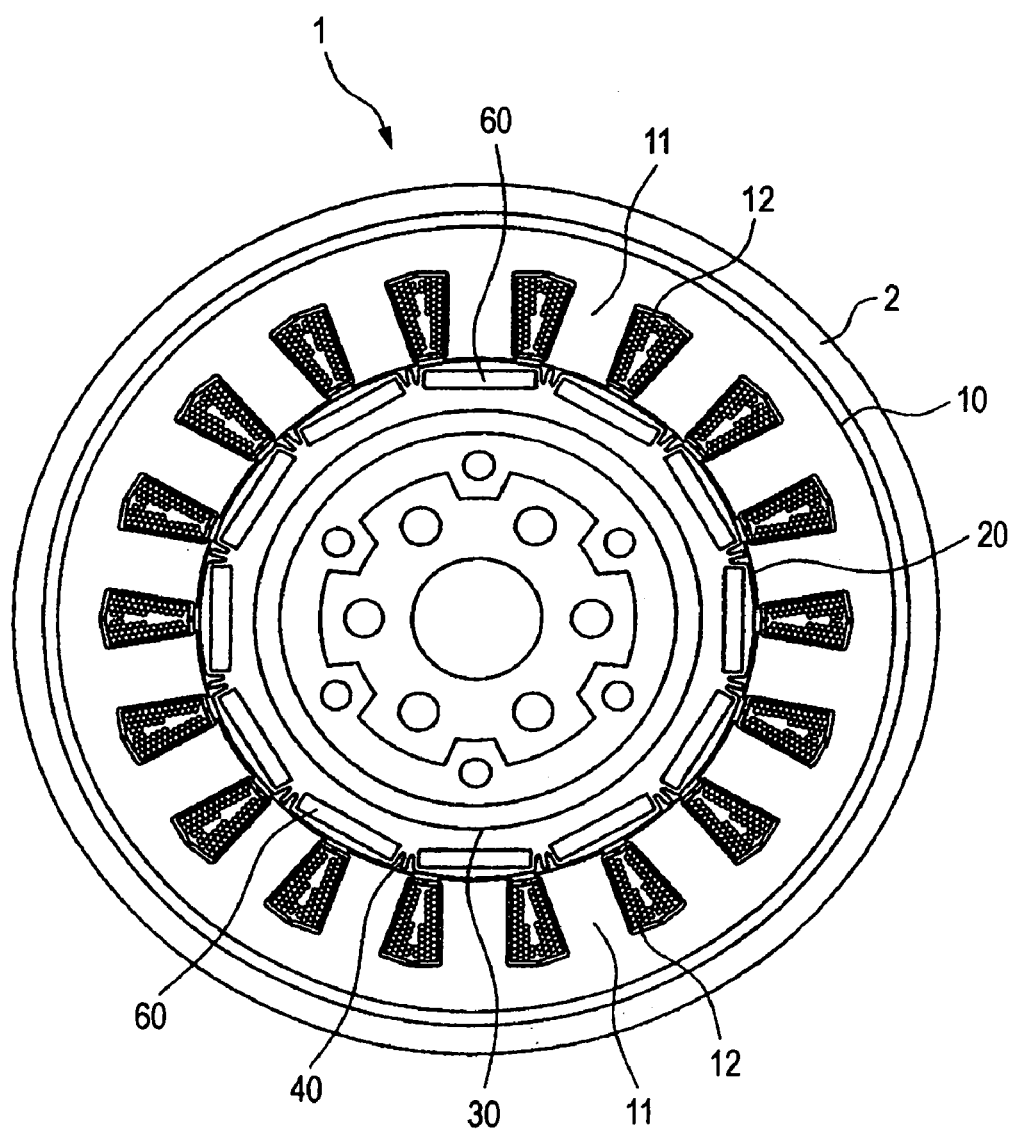
FIG. 1 is a schematic view of a first embodiment of the brushless motor according to this invention.

Now referring to the drawings from FIG. 1 to FIG. 7, an explanation will be given of a permanent magnet rotor according to this invention and a brushless motor equipped with such a rotor.

As seen from FIG. 1, a brushless motor 1 includes a stator 10 fixed to a casing 2 and a rotor (permanent magnet rotor) 20 rotatably supported by the casing 2. The stator 10 and rotor 20 are arranged concentrically and so as to be opposite in a radial direction.

The stator 10 is formed in a cylindrical shape and has a plurality of teeth iron cores 11 projected inwardly in the radial direction. A winding 12 is wound around each teeth iron core 11.

The brushless motor 1 also includes a control device for estimating the position of the rotor 20 on the basis of the current flowing through each of windings in a multiple phase when a voltage for detecting the position of the rotor 20 is applied to the windings 12 of the stator 10, thereby being capable of detecting the position of the rotor 20 with "senserless". The method of senserless position detection is a known technique and hence will not be described in detail.

Figure 3:
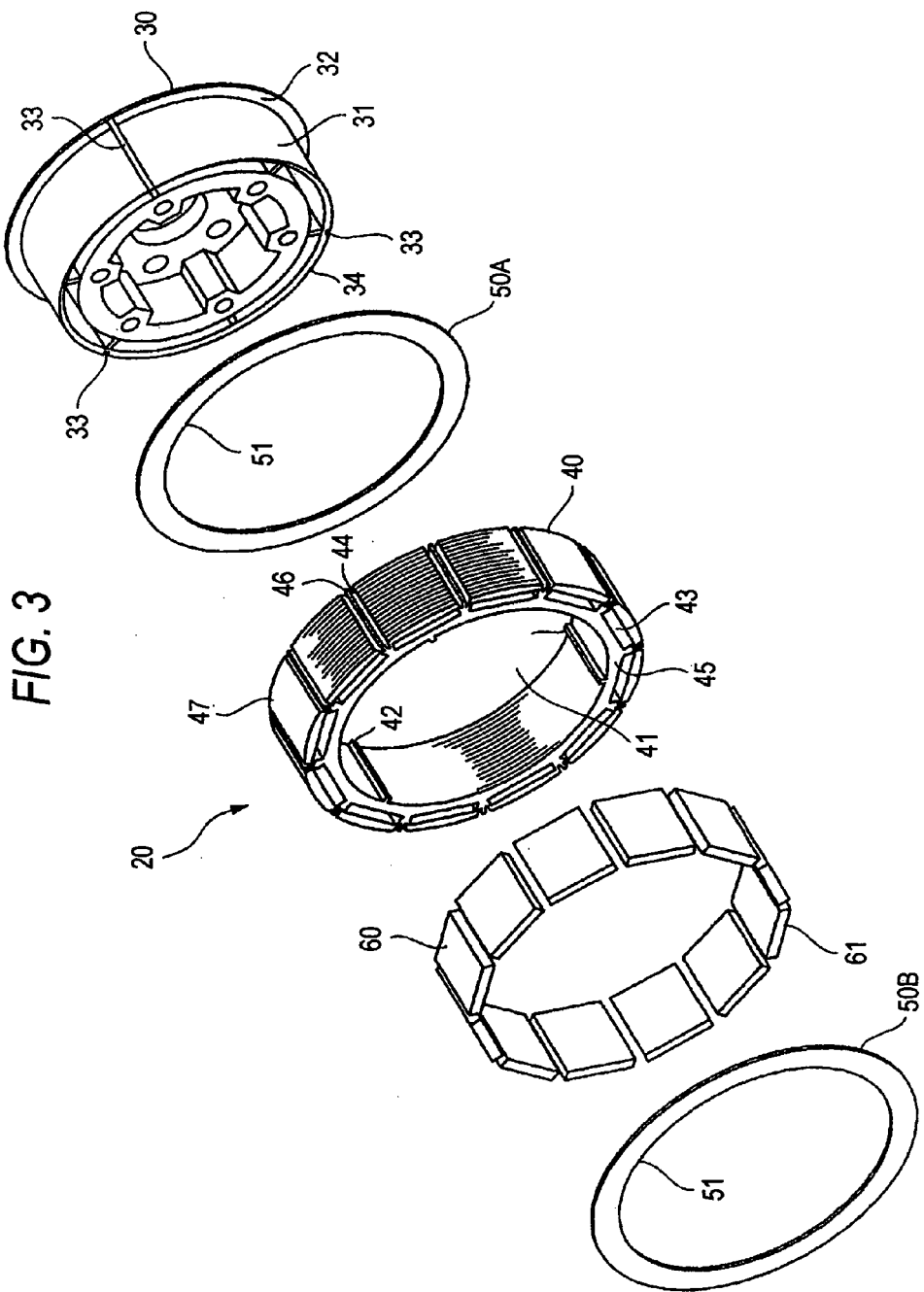
FIG. 3 is an exploded perspective view of the rotor in the first embodiment.

As seen from FIG. 3, the rotor 20 includes a rotor shaft 30, a rotor yoke (rotor iron core) 40, a pair of end plates 50A, 50B and a plurality of magnetic pieces 60. Incidentally, the brushless motor 1 according to this embodiment is a motor with six pairs of poles with 12 (twelve) permanent magnets 60.

The rotor shaft 30 is integrally formed in a hollow-cylindrical shape by casting or forging. The rotor shaft 30 has an extending-out segment 32 which is formed at the one end in an axial direction on an outer periphery 31 and extends out outwardly in a radial direction. The rotor shaft 30 has also three grooves 33 extending in the axial direction which are formed on the outer periphery 31 at regular intervals in a circumferential direction.

The endplate 50A, 50B is ring-shaped. In order that the end plate is pressed into the outer periphery 31, a hole 51 formed at the center has an inner diameter slightly smaller than the outer diameter of the outer periphery 31. Incidentally, the end plate 50A, 50B is made of a non-magnetic material such as austenitic stainless steel.

The rotor yoke 40 is formed in a ring-shape by stacking a large number of electromagnetic steel plates 45 each having the same shape and size. At the center of the rotor yoke 40, a through-hole 41 into which the rotor shaft 30 is inserted is formed. On the inner periphery of the rotor yoke 40, three projections 42 extending in the axial direction are formed at regular intervals in the circumferential direction.

On the outer periphery of the rotor yoke 40, a plurality of magnet insertion slots 43 in which permanent magnets 60 are inserted are formed at regular intervals in the circumferential direction. Each magnet insertion slot 43 penetrates the rotor yoke 40 in the axial direction.

Figure 4:
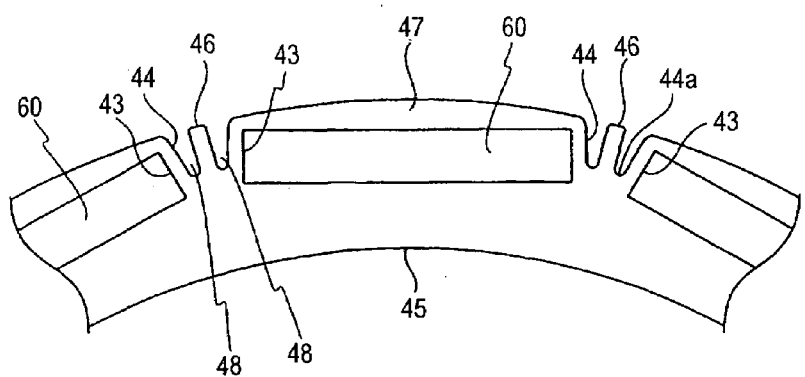
FIG. 4 is an enlarged front view of the main portion of the rotor in the first embodiment.

Further, as seen from FIG. 4, between the adjacent magnet insertion slots 43 on the outer periphery of the rotor 40, concaves 44 each opening outward in the radial direction are formed to extend in the axial direction of the rotor yoke 40 over the entire length thereof. The bottom 44a of the concave 44 is located in the middle of the magnet insertion slot 43 in the radial direction.

In each of the concaves 44, a protrusion 46 protruding outwardly in the radial direction from the center of the bottom 44a is formed. These protrusion 46 are also formed to extend in the axial direction of the rotor yoke 40 over the entire periphery thereof. The tip face of each protrusion 46 and the portion located more outer position than the magnet insertion slot 43 in the radial direction of the rotor yoke 40, i.e. the outer periphery of a magnet covering portion 47 are arranged on substantially the same virtual circle.

The rotor 20 is assembled through the following procedure, for example.

First, the end plate 50A is fit over the outer periphery 31 of the rotor shaft 30 by pressing from the other end 34 of the rotor 30.

Next, the rotor yoke 40 including a large number of stacked electromagnetic steel plates 45 is fit over the outer periphery 31 of the rotor shaft 30 by pressing from the other side 34 of the rotor shaft 30. In this case, pressing is carried out while the protrusions 42 of the rotor yoke 40 are engaged with the grooves 33 on the outer periphery 31 of the rotor shaft 30.

Subsequently, the permanent magnetic pole pieces 60 are inserted in the magnet insertion slots 43 of the rotor yoke 40, by one by, respectively. Thereafter, the end plate 50B is fit over the outer periphery 31 of the rotor shaft 30 from the other end 34 of the rotor shaft 30.

By assembling the rotor 20 through the procedure described above, the rotor shaft 30, rotor yoke 40, permanent magnetic pole pieces 60 and end plates 50A and 50B are integrated to complete the rotor 20. In this rotor 20, openings at both ends of each magnet insertion slot are closed by the end plates 50A and 50B, thereby preventing the permanent magnetic pole piece 60 from coming off from the rotor yoke 40.

In accordance with the brushless motor 1, since the rotor 20 is provided with the protrusions 46, the reluctance torque can be made larger than the case with no protrusion.

Figure 2:
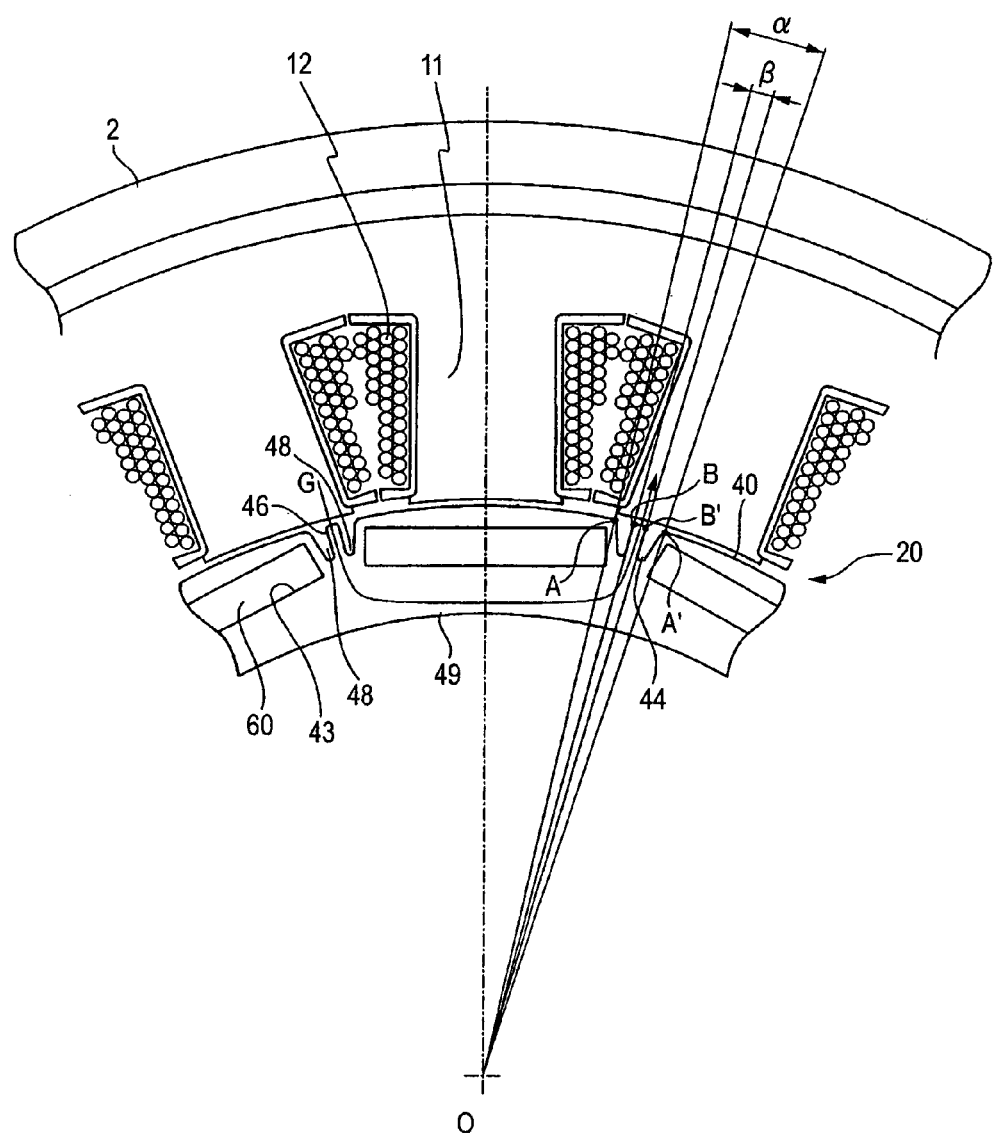
FIG. 2 is an enlarged view of the main portion in FIG. 1.

Further, as seen from FIG. 2, the magnetic flux G emitted from the stator 10 passes through the protrusion and also passes through a yoke area 40 located at a more inner side than the permanent magnetic pole piece in the radial direction. For this reason, the magnetic flux is difficult to be saturated so that the accuracy of the sensorless position detection of the rotor 20 is extremely high.

In addition, the rotor 20 is provided with the concaves 44 so that the grooves 48 are formed on both sides of each of the protrusions 46. This permits magnet heat generation to be suppressed, thereby making demagnetization difficult.

Thus, in the rotor 20 and brushless motor 1, the reluctance torque can be effectively used, the sensorless position detection accuracy of the rotor 20 can be improved and the magnet heat generation can be suppressed to make demagnetization difficult.

Meanwhile, in order to improve the sensorless position detecting accuracy, it is preferred that the circumferential size of the protrusion 46 is large and that of the groove 48 is small. On the other hand, in order to suppress heat generation of the magnet, it is preferred that the circumferential size of the groove 48 is large. In short, in determining the size of the groove 38, the improvement of the sensorless position detection accuracy and the suppression of the magnet heat generation are contradictive propositions. So it is very difficult to reconcile these two propositions.

The rotor yoke 40 according to this embodiment, however, can reconcile the improvement of the sensorless position detection accuracy and the suppression of the magnet heat generation by setting a predetermined angular relationship between the concave 44 and the protrusion 46.

Figure 5:
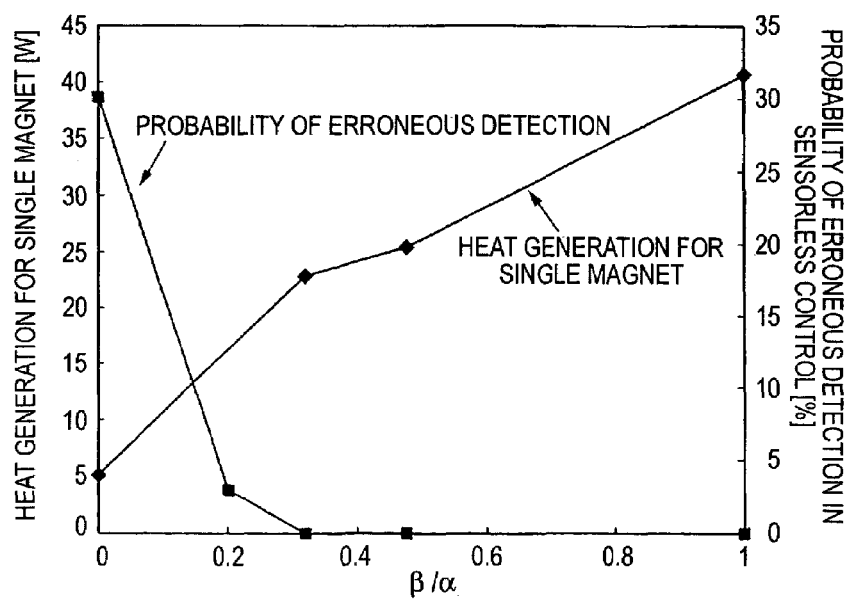
FIG. 5 is a graph showing an example of the experimental results on magnet heat generation and erroneous detection probability in sensorless position detection.

Referring to FIGS. 2 and 5, an explanation will be given of the angular relationship between the concave 44 and the protrusion 36. Assuming that the sandwiching angle formed by two sides of virtual lines connecting both outer ends A and A' in the radial direction of the concave 44 to the center axis O of the rotor yoke 40 (hereinafter referred to as the sandwiching angle of the concave 44) is $\alpha$, and the sandwiching angle formed by two sides of virtual lines connecting both outer ends B and B' in the radial direction of the protrusion 46 to the center axis O of the rotor yoke 40 (hereinafter referred to as the sandwiching angle of the protrusion 46) is $\beta$, using as a parameter the ratio ($\beta/\alpha$) of the sandwiching angle $\beta$ of the protrusion 46 to the sandwiching angle $\alpha$ of the concave 44, relationships between the quantity of generated heat (W) for each of the permanent magnet pieces 60 and the probability (%) of erroneous detection in the sensorless position detection have been experimentally calculated. FIG. 5 illustrates an example of the experimental result. This example is an experimental result when the sandwiching angle a of the concave 44 is set at 4.5 deg.

From the experimental result shown in FIG. 5, it has been found that if $\beta/\alpha$ is larger than 0.3, the probability of erroneous detection in the sensorless position detection is 0, and if $\beta/\alpha$ is smaller than 0.5, the magnet heat generation is greatly suppressed.

In view of this fact, in the brushless motor 1 according to this embodiment, $\beta/\alpha$ is set to be within a range of Equation 3, and preferably within a range of Equation 4.

$$0.3 < \beta/\alpha < 0.5$$

$$0.3 < \beta/\alpha < 0.4$$

By setting the range of $\beta/\alpha$ as described above, the improvement of the sensorless position detection accuracy of the brushless motor 1 and the suppression of the magnet heat generation can be reconciled.

Further, in the brushless motor according to this embodiment, the distance between the outer end A (or A' of the protrusion 46 and the outer end B (or B') of the concave 44 located oppositely thereto is set to be larger than that in the radial direction of the gap formed between the rotor 20 and the stator 10.

By setting these dimensions, it is possible to realize that the magnetic flux of the permanent magnet piece easily passes from the outer periphery of the magnet attaching segment toward the stator, the magnetic flux is difficult pass through the area where the protrusion and concave are arranged and the short-circuiting of the magnetic flux between the permanent magnet pieces adjacent to each other is difficult to occur. Thus, since the magnetic flux between the rotor and the stator can be usefully employed, the torque can be produced effectively.

Additionally, in the embodiment described above, a permanent magnet rotor with the permanent magnets embedded in the rotor iron core was explained. This invention, however, can be applied to the permanent magnetic rotor with the permanent magnets fixed to the outer periphery of the rotor iron core as shown in FIGS. 6 and 7.

The rotor 20 shown in FIGS. 6 and 7 will be explained briefly. On the outer periphery of the rotor yoke 40, magnet accommodating concaves (magnet attaching segments) 71 are provided in place of the magnet insertion slots 43. A concave 72 is formed between the magnet accommodating concaves 71 adjacent to each other. A protrusion 73 is formed at the center of the concave 72. The concave 71 corresponds to the concave 44 in the previous embodiment. The protrusion 73 corresponds to the protrusion 46 in the previous embodiment. Incidentally, the rotor yoke 40 is provided with magnet securing segments 75 each located between the magnet accommodating concave 71 and concave 72 so that the permanent magnet piece 60 is secured by the magnet securing segment 75, thereby preventing the permanent magnet piece from coming off outward in the radial direction. The remaining configuration, which is the same as that of the previous embodiment (FIGS. 1 to 5), will not be explained here with like reference numerals referring to like parts.

Figure 6:
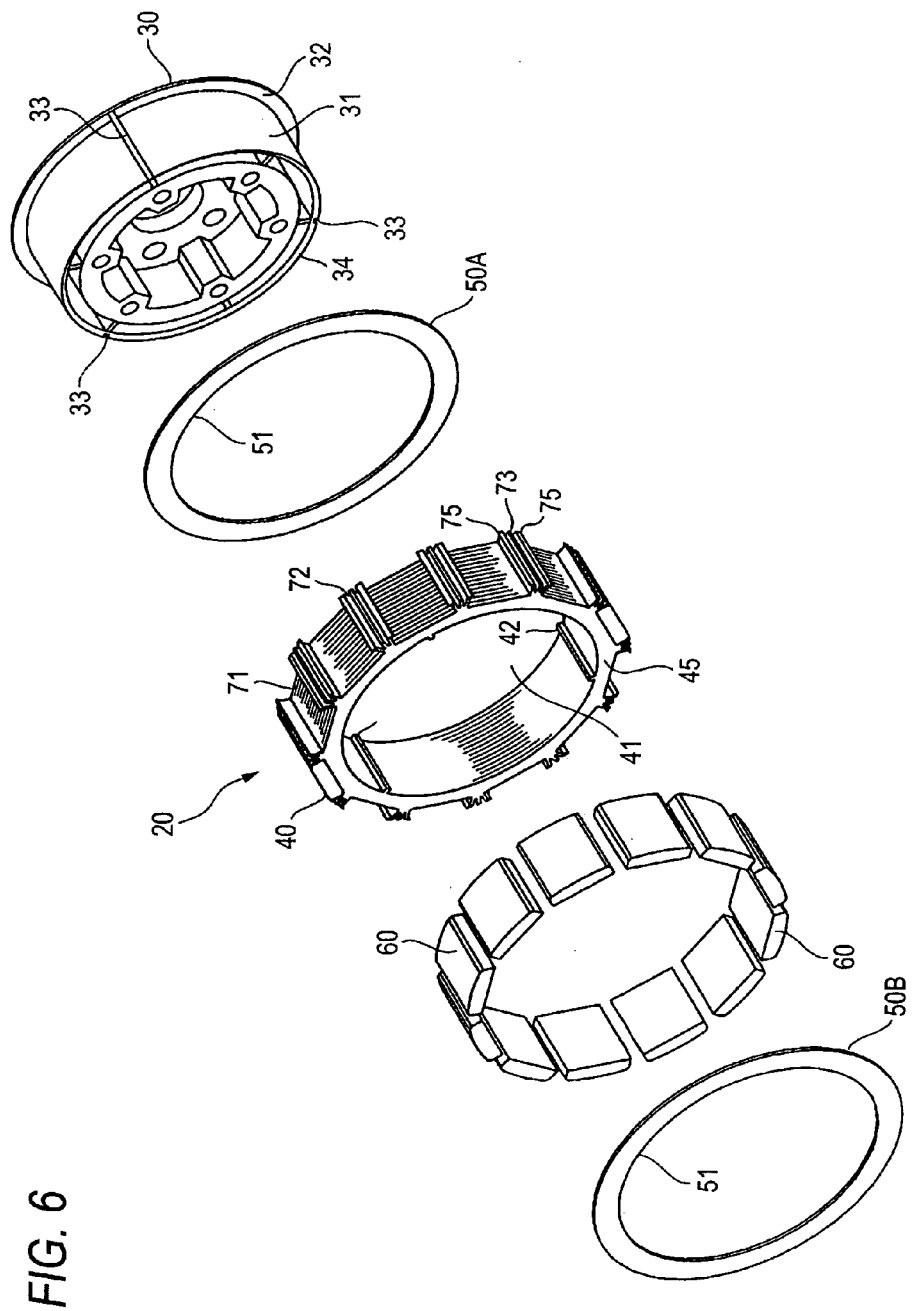
FIG. 6 is an exploded perspective view of the rotor in a second embodiment of the brushless motor according to this invention.
Figure 7:
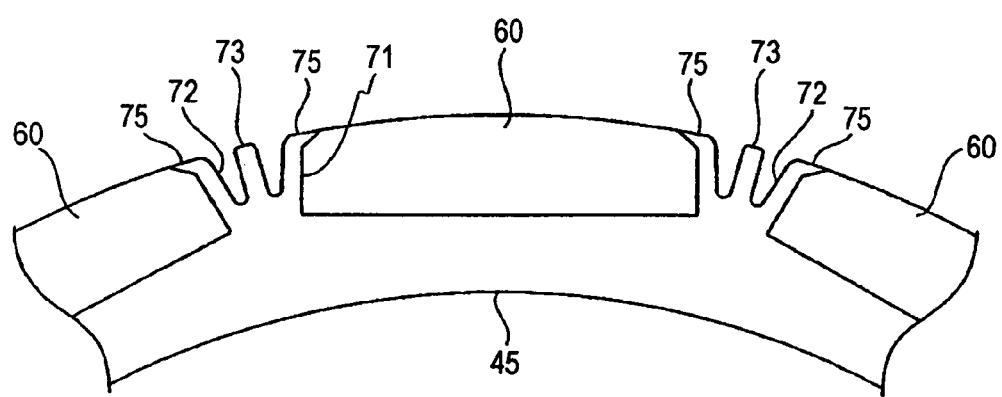
FIG. 7 is an enlarged front view of the main portion of the rotor in the first embodiment.

In this invention, the magnet attaching segments include not only the magnet insertion slots 43 shown in FIGS. 1 to 4 but also the magnet accommodating concaves 71 shown in FIGS. 6 and 7.

Incidentally, the embodiments described above were directed to an inner rotor type of motor in which the rotor is located inside the stator and a plurality of permanent magnet pieces are arranged on the outer periphery of the rotor. This invention, however, can be likewise applied to an outer rotor type of motor in which the rotor is located outside the stator and the plurality of permanent magnet pieces are arranged on the inner periphery of the rotor, thereby achieving the same effect.

This invention can be used as, for example, the motor generator of a hybrid motor vehicle which can run by the driving force of an internal combustion engine and a motor generator, and also used as the motor generator directly linked with the internal combustion engine. Further, this invention can also be applied to the other motor or generator than the motor generator for the hybrid motor vehicle.

What is claimed is:

1. A permanent magnet rotor comprising:
a plurality of permanent magnet pieces fixed in a plurality of magnet attaching segments provided on the outer periphery or inner periphery thereof, respectively, and
a rotor iron core with concaves each provided between the permanent magnet pieces adjacent to each other and protrusions each provided in each the concaves to protrude outwardly in the radial direction thereof, wherein
between a sandwiching angle $\alpha$ formed by two sides connecting both outer ends of each the concaves to the center axis of the rotor iron core and a sandwiching angle $\beta$ formed by two sides connecting both outer ends of each the protrusions to the center axis of the rotor iron core,
a relationship $0.3<\beta/\alpha<0.5$ is satisfied.

2. A brushless motor comprising:
a permanent magnet rotor including a plurality of permanent magnet pieces fixed in a plurality of magnet attaching segments provided on the outer periphery or inner periphery thereof, respectively, and a rotor iron core with concaves each provided between the permanent magnet pieces adjacent to each other and protrusions each provided in each the concaves to protrude outwardly in the radial direction thereof, and
a stator arranged oppositely to the permanent magnet rotor, wherein
a position of the rotor is capable to be estimated on the basis of a current flowing through each winding in a multiple phase when a voltage for detecting the position of the rotor is applied to windings of the stator, and
between a sandwiching angle $\alpha$ formed by two sides connecting both outer ends of each the concaves to the center axis of the rotor iron core and a sandwiching angle $\beta$ formed by two sides connecting both outer ends of each the protrusions to the center axis of the rotor iron core,
a relationship $0.3<\beta/\alpha<0.5$ is satisfied.

3. The brushless motor according to claim 2, wherein
a distance between the outer end of each the protrusions and the outer end of each the concaves located oppositely thereto is larger than a distance in the radial direction of a gap formed between the rotor and the stator.

* * * * *